United States Patent

F'Geppert

[11] 4,069,718
[45] Jan. 24, 1978

[54] SPEED CHANGE DEVICE
[75] Inventor: Erwin F'Geppert, Novi, Mich.
[73] Assignee: The United States of America as represented by the Secretary of the Army, Washington, D.C.
[21] Appl. No.: 722,998
[22] Filed: Sept. 13, 1976
[51] Int. Cl.² .............................................. F16H 13/04
[52] U.S. Cl. .................................................... 74/206
[58] Field of Search ........................ 74/206, 190, 198

[56] References Cited
U.S. PATENT DOCUMENTS

| | | | |
|---|---|---|---|
| 2,951,384 | 9/1960 | Rouverol | 74/198 |
| 3,469,463 | 9/1969 | Ishikawa | 74/206 |
| 3,988,950 | 11/1976 | Mori | 74/206 |

Primary Examiner—Samuel Scott
Assistant Examiner—Allan R. Burke
Attorney, Agent, or Firm—Peter A. Taucher; John E. McRae; Nathan Edelberg

[57] ABSTRACT

A mechanical speed change device designed to occupy minimum space in the radial direction. In operation, a ball type cam follower simultaneously tracks sinuous cam grooves in the drive and driven members. The lead angles of the respective cam grooves are different so that a given axial displacement of the cam follower requires different rotational movements of the drive and driven members. Therefore a given rotational speed of the drive member produces a different rotational speed of the driven member.

8 Claims, 2 Drawing Figures

SPEED CHANGE DEVICE

The invention described herein may be manufactured, used, and licensed by or for the Government for governmental purposes without payment to me of any royalty thereon.

BACKGROUND AND SUMMARY OF THE INVENTION

Conventional speed change devices somtimes employ spur gears carried on parallel shafts. Such shaft-gear arrangements require consideralbe radial space for the gears and considerable axial space for the shaft bearings. The present invention seeks to provide a speed change device that minimizes the radial space requirement without unduly increasing the axial space requirement.

THE DRAWINGS

Figure 1:
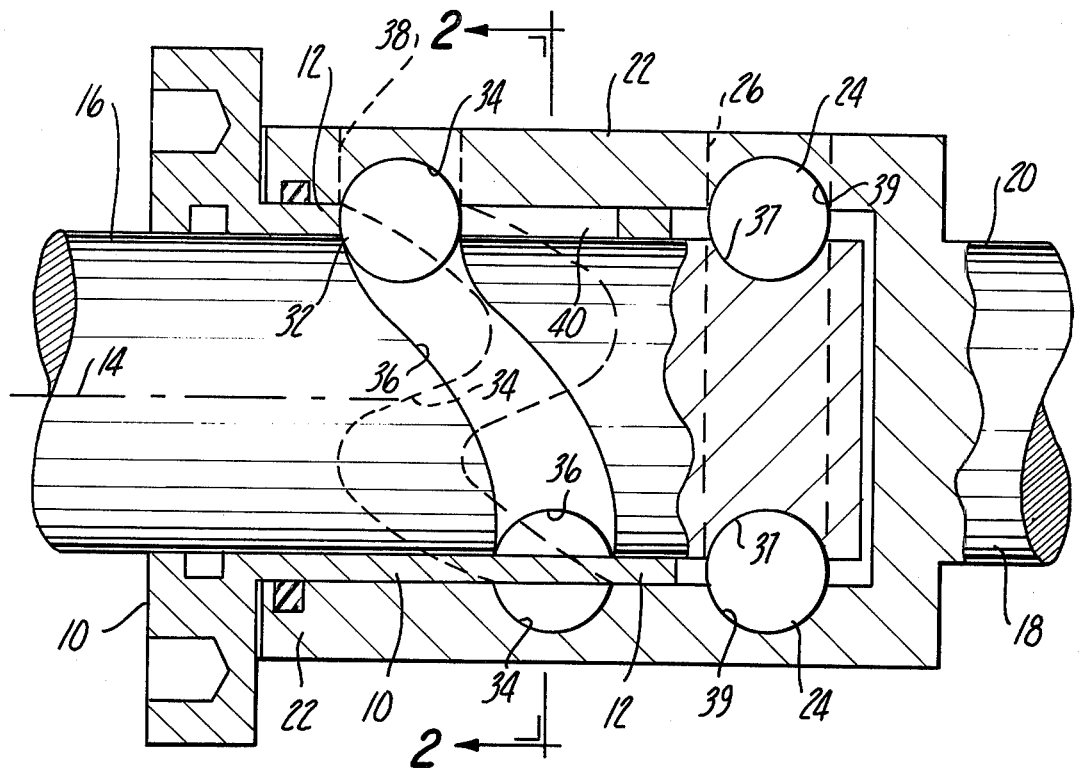
FIG. 1 is a longitudinal sectional view taken through one embodiment of the invention.

The device shown in FIG. 1 comprises a stationary member 10 that includes a sleeve 12 defining a central rotational axis 14 for a shaft-type drive member 16. Shaft member 16 connected at its left end to any suitable powered device (not shown). The illustrated portion of shaft member 16 is provided with an endless sinuous cam groove 36 and an endless radial groove 37. The sinuous groove acts as a track for a cam follower ball 32 trapped within an axial slot 40 in sleeve section 12 of stationary member 10; rotation of shaft member 16 around axis 14 produces axial motion of ball 32 back and forth along slot 40. The aforemention radial groove 37 register with a second radial groove 39 formed in the interior surface of driven member 18; closely-spaced anti-friction balls 24 are arranged in grooves 37 and 39 to form an anti-friction connection between members 16 and 18. Member 18 is able to move rotationally on member 16 but not axially.

Anti-friction balls 24 absorb axial thrust forces that might otherwise tend to produce relative axial displacement of members 16 and 18. Initial loading of balls 24 into the raceway (i.e. grooves 37 and 39) may be accomplished by first removing a plug 26 that is suitably threaded or otherwise secured in sleeve section 22 of member 18.

Drive forces are transmitted from drive member 16 to driven member 18 by means of the cam follower ball 32. As seen in FIG. 1, the ball has its outer segmental portion disposed in a sinuous cam-forming groove 34 in member 18, and its inner segmental portion disposed in a sinuous cam-forming groove 36 in member 16. The ball may be loaded into the cam grooves through an opening that is subsequently closed by a plug 38.

The two sinuous grooves 34 and 36 are similar in that each groove has the same displacement or amplitude in the axial direction. However the grooves are dissimilar in that each groove has a different lead angle measured from an imaginary radial plane taken normal to axis 14. The lead angle of groove 34 is such that this groove contains three complete waves or undulations; the lead angle of groove 36 is such that this groove contains only one complete wave or undulation.

Each revolution of input shaft member 16 produces one complete oscillation of ball 32 along slot 40, i.e. one stroke to the right and a return stroke to the left. The resulting rotation of output member 18 is only one third of a revolution because groove 34 has a different lead angle (compared to groove 36). The ball-cam track arrangement thus produces speed reduction. If the assembly is located so that member 18 is the input member then the assembly will provide speed increase. The speed ratio is related to the groove lead angle relationships, i.e. the number of undulations contained in the respective grooves 34 and 36.

Figure 2:
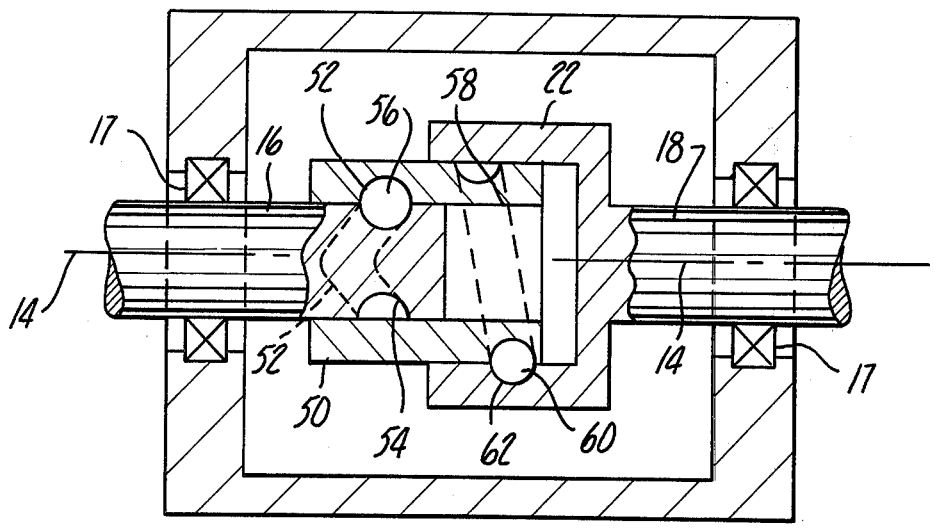
FIG. 2 is longitudinal sectional view taken through another embodiment of the invention.

The device shown in FIG. 2 has the same purpose and general mode of operation as the FIG. 1 device; however there are structural differences. In the FIG. 2 arrangement the input shaft 16 and output shaft 18 are supported in bearings 17 carried by a stationary housing 19. A cam follower sleeve 50 is interposed between shafts 16 and 18. Spherical pocket 52 in the inner surface of sleeve 50 carries a ball 56 that tracks in an endless sinuous cam groove 54 formed in shaft 16. Groove 54 contains tow complete undulations.

The outer surface of sleeve 50 includes a sinuous cam groove 58 having one complete undulation. A cam follower ball 60 is carried in a spherical pocket 62 in output shaft section 22 for tracking movement along groove 58. Ball 60 transmits rotational motion from sleeve 50 to output member 18. As shown, sinuous cam grooves 54 and 58 are formed in members 16 and 50; these sinuous grooves could instead be formed in the associated member 50 and 22, respectively.

The axial displacement (amplitude) of sinuous groove 54 is the same at that of groove 58. Therefore the tendency of ball 56 to produce axial motion in input member 16 is relieved by a tendency of ball 60 to produce an equivalent axial motion in output member 18. The aforementioned bearings 17 are constructed to absorb generated thrust loads so that members 16 and 18 have no actual axial movements.

The sinuous character of groove 54 is such that each revolution of shaft 16 tends to produce two axial oscillations to sleeve 50 (two strokes to the right and two return strokes to the left). The nature of groove 58 is such that each axial oscillation of sleeve 50 tends to produce one revolution of output shaft 18. Each revolution of input member 16 therefore produces two revolutions of output shaft 18. The general operational mode of the FIG. 2 device is similar to that of the FIG. 1 device.

Advantageously the assemblies shown in FIGS. 1 and 2 may to designed to use minimum space in the radial direction. Since these assemblies use anti-friction balls in the force-transmission path they should have relatively low power consumption. Each assembly includes a housing structure that can be sealed without too much difficulty. In summary then, the illustrated devices are believed to have the multiple advantages of small radial dimensions, low power consumption, and easy-sealing capability.

I wish it to be understood that I do not desire to be limited to the exact details of construction shown and described for obvious modifications will occur to a person skilled in the art.

I claim:

1. A speed change device comprising drive and driven members arranged on a common rotational axis; and a force-transmitting connection between said member; said force-transmitting connection comprising a first sinuous cam surface associated with the drive member, a second sinuous cam surface associated with the driven member, and cam follower means simultaneously tracking each cam surface; the lead angles on the sinuous cam surfaces being different, whereby the rotational speeds of the drive and drived members are different.

2. The device of claim 1; the force-transmitting connection comprising means (40) for confining the cam follower means to reciprocation in the axial direction during rotational movements of the drive and driven members.

3. The device of claim 1; the first sinuous cam surface comprising an endless groove (36) formed in the drive member; the second sinuous cam surface comprising an endless groove (34) formed in the driven member; the cam follower means comprising at least one ball (32) having different sections thereof disposed in said grooves.

4. The device of claim 1, and further comprising antifriction thrust means (24) interposed between the drive and driven members for absorbing axial forces that might otherwise tend to produce relative axial displacement of said members.

5. The device of claim 1; said drive and driven members having radially spaced wall areas concentrically arranged one within another; the first sinuous cam comprising an endless groove (36) formed in one of said wall areas; the second sinuous cam comprising an endless groove (34) formed in the other of said wall areas; a staionary sleeve (12) located between said concertrically arranged wall areas; at least one axial slot (40) formed in said sleeve; the cam follower means comprising at least one cam follower (32) position in said slot for translational movement in the axial direction, said cam follower projecting into both endless grooves to transmit toque from the drive member to the driven member.

6. The device of claim 1; said cam follower means comprising a sleeve (50) interposed between the drive and driven members, the first sinuous cam surface being operatively located between the drive member and the sleeve, the second sinuous cam surface being operatively located between the sleeve and driven member.

7. The device of claim 6; the cam follower means further comprising a ball follower tracking ech sinuous cam surface so that force transmission takes place through a path consisting of the drive member, one ball follower, the sleeve, the other ball follower, and the driven member.

8. The device of claim 1; each sinuous cam surface having the same amplitude, whereby the drive and driven members are prevented from axial movements.

* * * * *